United States Patent
Kim et al.

(10) Patent No.: US 10,940,738 B2
(45) Date of Patent: Mar. 9, 2021

(54) AIR CONDITIONING CONTROL SYSTEM AND METHOD FOR VEHICLES

(71) Applicants: Hyundai Motor Company, Seoul (KR); Kia Motors Corporation, Seoul (KR)

(72) Inventors: Myung-Hoe Kim, Seoul (KR); Byeong-Moo Jang, Suwon-si (KR); Jong-Hwan Kwon, Seoul (KR); Seong-Nam Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 272 days.

(21) Appl. No.: 15/364,425

(22) Filed: Nov. 30, 2016

(65) Prior Publication Data

US 2018/0001736 A1    Jan. 4, 2018

(30) Foreign Application Priority Data

Jul. 1, 2016    (KR) .......................... 10-2016-0083553

(51) Int. Cl.
  *B60H 1/00*    (2006.01)
(52) U.S. Cl.
  CPC ..... *B60H 1/00064* (2013.01); *B60H 1/00028* (2013.01); *B60H 1/0073* (2019.05);
  (Continued)
(58) Field of Classification Search
  CPC ............ B60H 1/00892; B60H 1/00807; B60H 1/00792; B60H 1/00878; B60H 1/00835;
  (Continued)

(56) References Cited

U.S. PATENT DOCUMENTS 5,392,845 A * 2/1995 Honda ............... B60H 1/00735
                                                            165/203
5,483,805 A * 1/1996 Fujii .................. B60H 1/00392
                                                            62/158
(Continued)

FOREIGN PATENT DOCUMENTS

AU        763646 B2 *  7/2003  ......... B60H 1/00792
DE    19708383 C1 *  6/1998  ......... B60H 1/00064
(Continued)

*Primary Examiner* — Joel M Attey
*Assistant Examiner* — For K Ling
(74) *Attorney, Agent, or Firm* — Morgan, Lewis & Bockius LLP

(57) ABSTRACT

An air conditioning control system and method for a vehicle may include: an alternate control entering temperature difference excess determination step of determining whether a difference in temperature between a side vent temperature sensor and a shower duct temperature sensor exceeds an alternate control entering temperature difference; and an alternate control step of determining that a side vent grill may have been closed, when the difference exceeds the alternate control entering temperature difference, and performing an alternate control operation of regarding the temperature of air measured by the shower duct temperature sensor as the temperature of air discharged from the side vent grill and controlling a temperature of air to be discharged from a center vent grill.

12 Claims, 9 Drawing Sheets

(52) U.S. Cl.
CPC ..... *B60H 1/00778* (2013.01); *B60H 1/00792*
(2013.01); *B60H 1/00842* (2013.01); ***B60H
1/00878*** (2013.01); *B60H 2001/00214*
(2013.01)

(58) Field of Classification Search
CPC .......... B60H 2021/003; B60H 1/00842; B60H
1/00871; B60H 1/00864
See application file for complete search history.

(56) References Cited

U.S. PATENT DOCUMENTS

| | | | |
|---|---|---|---|
| 6,709,326 B2 * | 3/2004 | Shideler | B60H 1/00764 454/162 |
| 2005/0040942 A1 * | 2/2005 | Johnston | B60H 1/00792 340/449 |
| 2005/0134210 A1 * | 6/2005 | Nakajima | B60H 1/00021 318/652 |
| 2010/0018229 A1 * | 1/2010 | Choi | B60H 1/00807 62/178 |

FOREIGN PATENT DOCUMENTS

| | | | | |
|---|---|---|---|---|
| DE | 102006038711 A1 * | 2/2008 | ......... | B60H 1/00864 |
| DE | 102009059983 A1 * | 6/2011 | ......... | B60H 1/00778 |
| JP | H 10138732 A | 5/1998 | | |
| JP | 3271283 B2 | 4/2002 | | |
| KR | 2002-0057160 A | 7/2002 | | |
| KR | 20110094865 A | 8/2011 | | |

* cited by examiner

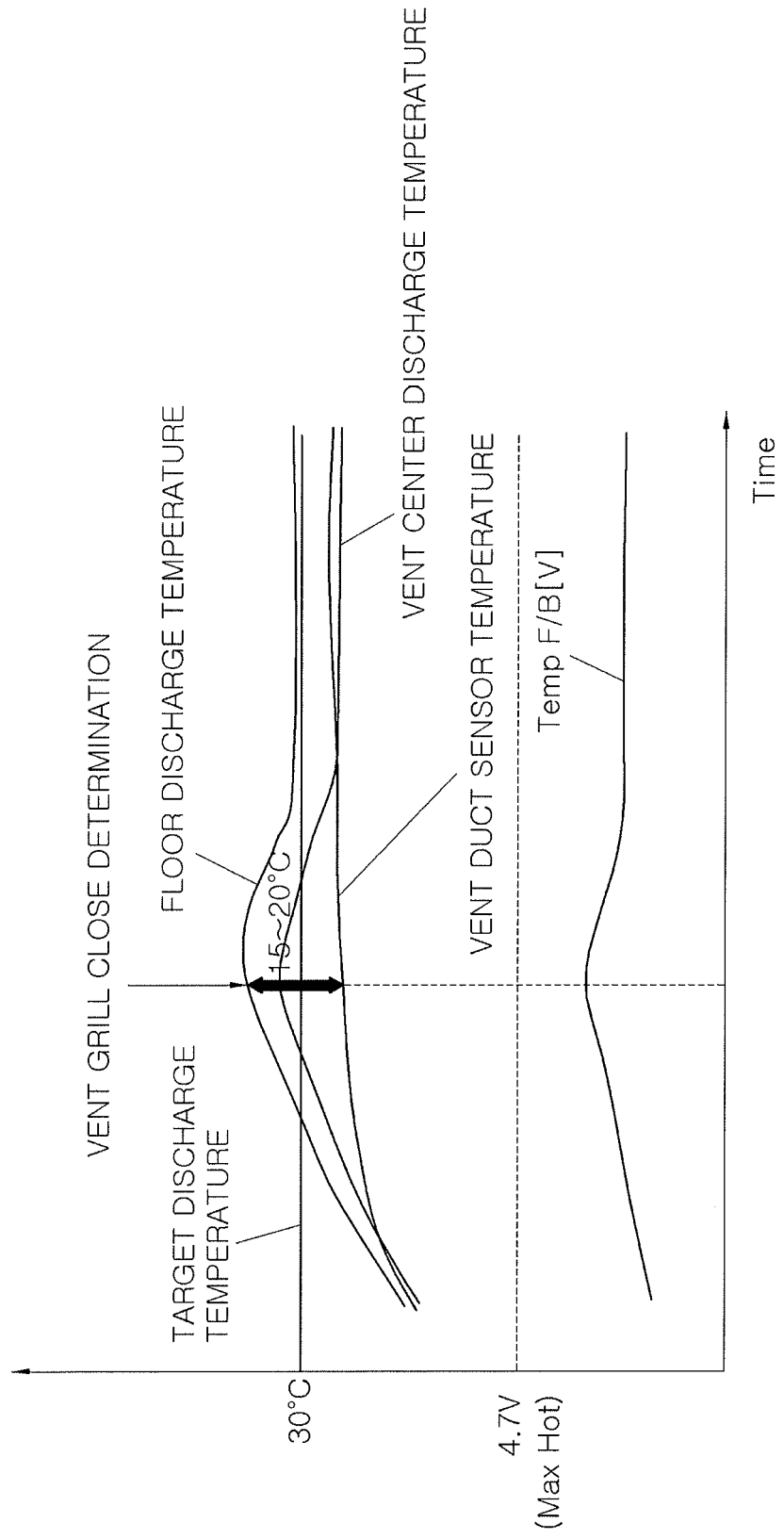

AIR CONDITIONING CONTROL SYSTEM AND METHOD FOR VEHICLES

CROSS-REFERENCE TO RELATED APPLICATIONS

The present application claims priority to Korean Patent Application No. 10-2016-0083553, filed on Jul. 1, 2016, the entire contents of which is incorporated herein for all purposes by this reference

BACKGROUND OF THE INVENTION

Field of the Invention

The present invention relates to air conditioning control system and method for controlling the temperature of a passenger compartment of a vehicle; and particularly, to air conditioning control system and method for a vehicle which can control, even when a side vent grill is closed and the temperature of air to be discharged toward the face of an occupant cannot be thus measured, the temperature of air to be discharged to the face or upper part of the occupant such that it is close to a set target temperature.

Description of Related Art

In general, a vehicle is provided with an air conditioning system to allow an occupant to control the temperature of a passenger compartment of the vehicle to a desired temperature. The air conditioning system is configured to control the temperature and humidity in the passenger compartment.

For this, as shown in FIG. 1, a plurality of vent grills are mounted in a dashboard of the vehicle to control discharge of conditioned air into the passenger compartment of the vehicle. Side vent grills 11 and center vent grills 12 are mounted in an upper portion of the dashboard to control the discharge of conditioned air toward the faces or upper bodies of occupants who sit on a driver's seat and passenger seat. The side vent grills 11 and the center vent grills 12 are respectively positioned on ends of side ducts 11a and center ducts 12a that are coupled to an air conditioner 30. As shown in FIG. 2, cold/hot air supplied from the air conditioner 30 to the side ducts 11a and the center ducts 12a are supplied into the passenger compartment of the vehicle through the side vent grills 11 and the center vent grills 12.

Furthermore, shower duct discharge ports 13 coupled to the air conditioner 30 through shower ducts 13a are mounted in a lower portion of the dashboard so that cold/hot air is supplied toward the floor of the vehicle.

In addition, air discharge ports coupled to the air conditioner through ducts are mounted in a front end and side portions of the dashboard so that dry air is discharged toward windows of the vehicle to remove moisture from the windows.

An occupant who sits on a driver's seat or passenger seat uses a control knob or control switch provided on the dashboard to set a desired target temperature and a desired air blowing mode.

In high-quality vehicle, the temperature of air to be discharged from the vent grills 11 and 12 or the shower duct discharge ports 13 is detected in real time so that the temperature of the passenger compartment may be controlled to provide pleasant air to the occupant.

For this, a side vent temperature sensor 11b is mounted in each side vent grill 11 or a portion of each side duct 11a that is adjacent to the corresponding side vent grill 11. The side vent temperature sensor 11b measures the temperature of air to be discharged from the side vent grill 11 toward the face or upper body of the occupant. Furthermore, a shower duct temperature sensor 13b is mounted in each shower duct 13a to measure the temperature of air to be discharged from the shower duct discharge port 13 toward the feet of the occupant.

The side vent grill 11 is usually in an open state, and the shower duct discharge port 13 may have no separate grill. Therefore, the temperatures of air to be discharged from the side vent grill 11 and the shower duct discharge port 13 can be detected in real time.

However, when the occupant closes the side vent grill 11, air is not discharged through the side vent grill 11. Hence, it is impossible to measure the temperature of air using the temperature sensor 11b mounted adjacent to the side vent grill 11.

When the side vent grill 11 is closed, there is no flow of air through the side duct 11a, so that the side vent temperature sensor 11b cannot sense the temperature of air to be discharged from the side vent grill 11.

When the side vent grill 11 is closed, the side vent temperature sensor 11b is not able to measure the temperature of air supplied from the air conditioner 30 but senses the temperature in the side duct 11a and uses it to control the temperature of the passenger compartment.

For example, in the winter, because the temperature in the side duct 11a is comparatively low, the controller 20 controls the air conditioning system such that high-temperature air having a temperature higher than a set temperature is discharged through the center vent grill 12. In the summer, because the temperature in the side duct 11a is comparatively high, the controller 20 controls the air conditioning system such that low-temperature air having a temperature lower than a set temperature is discharged through the center vent grill 12. Thereby, as shown in FIG. 5, during a heating operation, because information about the temperature in the side duct 11a cannot be fed back, a command voltage value of an actuator is increased to the maximum value (e.g., 4.7 V) such that the degree of opening of a temp door for heating is gradually increased. Therefore, until the temperature of air discharged through the center vent grill 12 or the shower duct discharge port 13 converges on a target discharge temperature, high-temperature air is continuously discharged through the open center vent grill 12. That is, during the heating operation, air having an excessively high temperature is supplied into the passenger compartment, whereby the occupant may have an unpleasant feeling.

Also, during a cooling operation, because the temperature of air to be discharged through the center vent grill 12 or the shower duct discharge port 13 is continuously reduced, the occupant may have an unpleasant feeling.

This is caused, of the driver's seat and the passenger seat, at a side in which the side vent grill 11 is closed.

To overcome the above-mentioned problem, a grill open/close sensing unit 11c interlocked with a control knob of each side vent grill 11 is mounted. When the side vent grill 11 is closed, the grill open/close sensing unit 11c transmits, to the controller 20, a close signal indicating that the side vent grill 11 is in a closed state. When the close signal is inputted from the grill open/close sensing unit 11c, the controller 20 ignores an output value of the temperature sensor 11c of the side vent grill 11 and uses other sensors to control the temperature of the passenger compartment of the vehicle (refer to FIG. 3). Since the temperature of the passenger compartment is controlled using other sensors, air having a comparatively normal temperature can be discharged from the center vent grill 12 despite the state in which the side vent grill 11 is closed.

However, because the additional grill open/close sensing unit 11c must be mounted in the side vent grill 11, the production cost is increased, and the weight of the vehicle is also increased. In addition, to install the grill open/close sensing unit 11c, various wires must be coupled to the related parts, thus increasing the time and labor required to manufacture the vehicle.

FIG. 4 illustrates the case where a close signal indicating that the side vent grill 11 is in the closed state is not outputted from the grill open/close sensing unit 11c although the side vent grill 11 is in the close state. In this case, because the controller 20 cannot sense whether the side vent grill 11 is closed, the value of the side vent temperature sensor 11b is used. Therefore, when the side vent grill 11 is in the closed state, air having an abnormal temperature is discharged from the center vent grill 12.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing air conditioning control system and method for a vehicle which can determine whether a side vent grill is closed using a difference in temperature between a side vent temperature sensor and a shower duct temperature sensor without using a separate unit for detecting whether the side vent grill is closed, so that conditioned air can be discharged from a center vent grill such that even when the side vent grill is in the closed state, air in a passenger compartment can be conditioned to a predetermined temperature.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, there is provided an air conditioning control system for a vehicle, including: side vent grills mounted in respective opposite ends of an upper portion of a dashboard; center vent grills mounted in a central portion of the upper portion of the dashboard at positions spaced apart from each other; shower duct discharge ports mounted in a lower portion of the dashboard at positions spaced apart from each other; a side vent temperature sensor configured to measure a temperature of air to be discharged from each of the side vent grills; a shower duct temperature sensor configured to measure a temperature of air to be discharged from each of the shower duct discharge ports; and a controller configured to control an operation of an air conditioner using values inputted from the side vent temperature sensor and the shower duct temperature sensor, wherein, when a difference between the temperature measured by the side vent temperature sensor and the temperature measured by the shower duct temperature sensor exceeds a preset alternate control entering temperature difference, the controller performs an alternate control operation of regarding the temperature measured by the shower duct temperature sensor as the temperature outputted from the side vent temperature sensor and controlling the temperature of air to be discharged from the center vent grills.

When time for which the air conditioner is in a vent mode in which air is discharged toward a face or upper body of an occupant or a bi-level mode in which air is discharged toward a floor of the vehicle and the face or upper body of the occupant exceeds a preset alternate control entering time, the controller may perform the alternate control operation.

When the alternate control operation is performed, the controller may control a flow rate of air to be discharged from the shower duct discharge ports such that the flow rate is always a predetermined value or more.

The controller may individually perform the alternate control operation for each of a driver's seat and a passenger seat.

In accordance with another exemplary embodiment of the present invention, there is provided a method of controlling an air conditioning control system for a vehicle, the air conditioning control system including: side vent grills mounted in respective opposite ends of an upper portion of a dashboard; center vent grills mounted in a central portion of the upper portion of the dashboard at positions spaced apart from each other; shower duct discharge ports mounted in a lower portion of the dashboard at positions spaced apart from each other; a side vent temperature sensor configured to measure a temperature of air to be discharged from each of the side vent grills; and a shower duct temperature sensor configured to measure a temperature of air to be discharged from each of the shower duct discharge ports, the method including: an alternate control entering temperature difference excess determination operation of determining whether a difference in temperature between the side vent temperature sensor and the shower duct temperature sensor exceeds an alternate control entering temperature difference preset to enter an alternate control operation; and an alternate control operation of determining that the side vent grills have been closed, when the difference in temperature between the side vent temperature sensor and the shower duct temperature sensor exceeds the alternate control entering temperature difference, and performing an alternate control operation of regarding the temperature measured by the shower duct temperature sensor as the temperature of air discharged from the side vent grills and controlling a temperature of air to be discharged from the center vent grills.

The method may further include: the air blowing mode determination operation of determining, before the alternate control entering temperature difference excess determination operation is performed, whether the air blowing mode is one of a vent mode in which air is discharged toward a face or upper body of an occupant and a bi-level mode in which air is discharged toward a floor of the vehicle and the face or upper body of the occupant, wherein when the air blowing mode is one of the vent mode and the bi-level mode in the air blowing mode determination operation, the alternate control entering temperature difference excess determination operation may be performed.

The method may further include: an alternate control entering time excess determination operation of determining, between the air blowing mode determination operation and the alternate control entering temperature difference excess determination operation, whether time for which the air conditioner is in the vent mode or the bi-level mode exceeds an alternate control entering time preset to enter the alternate control operation, wherein when a time for which the air conditioner is in the vent mode or the bi-level mode exceeds the alternate control entering time in the alternate control entering time excess determination operation, the alternate control entering temperature difference excess determination operation may be performed.

In the alternate control operation, a flow rate of air to be discharged from the shower duct discharge ports may always be a predetermined value or more.

When it is determined in the air blowing mode determination operation that the air blowing mode is neither the vent mode nor the bi-level mode, a normal control operation of controlling an air conditioning system may be performed.

When a time for which the air conditioner is in the vent mode or the bi-level mode does not exceed the alternate control entering time in the alternate control entering time excess determination operation, a normal control operation of controlling an air conditioning system may be performed.

When the difference in temperature between the side vent temperature sensor and the shower duct temperature sensor does not exceed the alternate control entering temperature difference in the alternate control entering temperature difference excess determination operation, a normal control operation of controlling an air conditioning system may be performed.

The alternate control operation may be independently applied to each of a driver's seat and a passenger seat.

In the alternate control entering time excess determination operation, the alternate control entering time may be set within a range from thirty seconds to two minutes.

In the alternate control entering temperature difference excess determination operation, the alternate control entering temperature difference may be set within a range from 15° C. to 20° C.

The method may further include, before the alternate control entering temperature difference excess determination operation, a temperature sensor condition determination operation of determining whether the side vent temperature sensor and the shower duct temperature sensor are normal, wherein when both the side vent temperature sensor and the shower duct temperature sensor are normal, the alternate control entering temperature difference excess determination operation may be performed.

When it is determined in the temperature sensor condition determination operation that one of the side vent temperature sensor and the shower duct temperature sensor is abnormal, a preset fail-safe control operation may be performed.

After the alternate control operation is performed, an ignition off determination operation of determining whether the vehicle is in an ignition on or off state may be performed. When the vehicle is in the ignition on state, the process may return to the beginning.

After the normal control operation is performed, an ignition off determination operation of determining whether the vehicle is in an ignition on or off state may be performed. When the vehicle is in the ignition on state, the process may return to a first stage.

After the normal control operation is performed, an ignition off determination operation of determining whether the vehicle is in an ignition on or off state may be performed. When the vehicle is in the ignition on state, the process may return to a first stage.

After the fail-safe control operation is performed, an ignition off determination operation of determining whether the vehicle is in an ignition on or off state may be performed. When the vehicle is in the ignition on state, the process may return to the temperature sensor condition determination operation.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

BRIEF DESCRIPTION OF THE DRAWINGS

FIG. 8 is a graph showing discharge air temperatures of a side vent grill and a center vent grill when the air conditioning control system and method according to the exemplary embodiment of the present invention are used.

Figure 1:
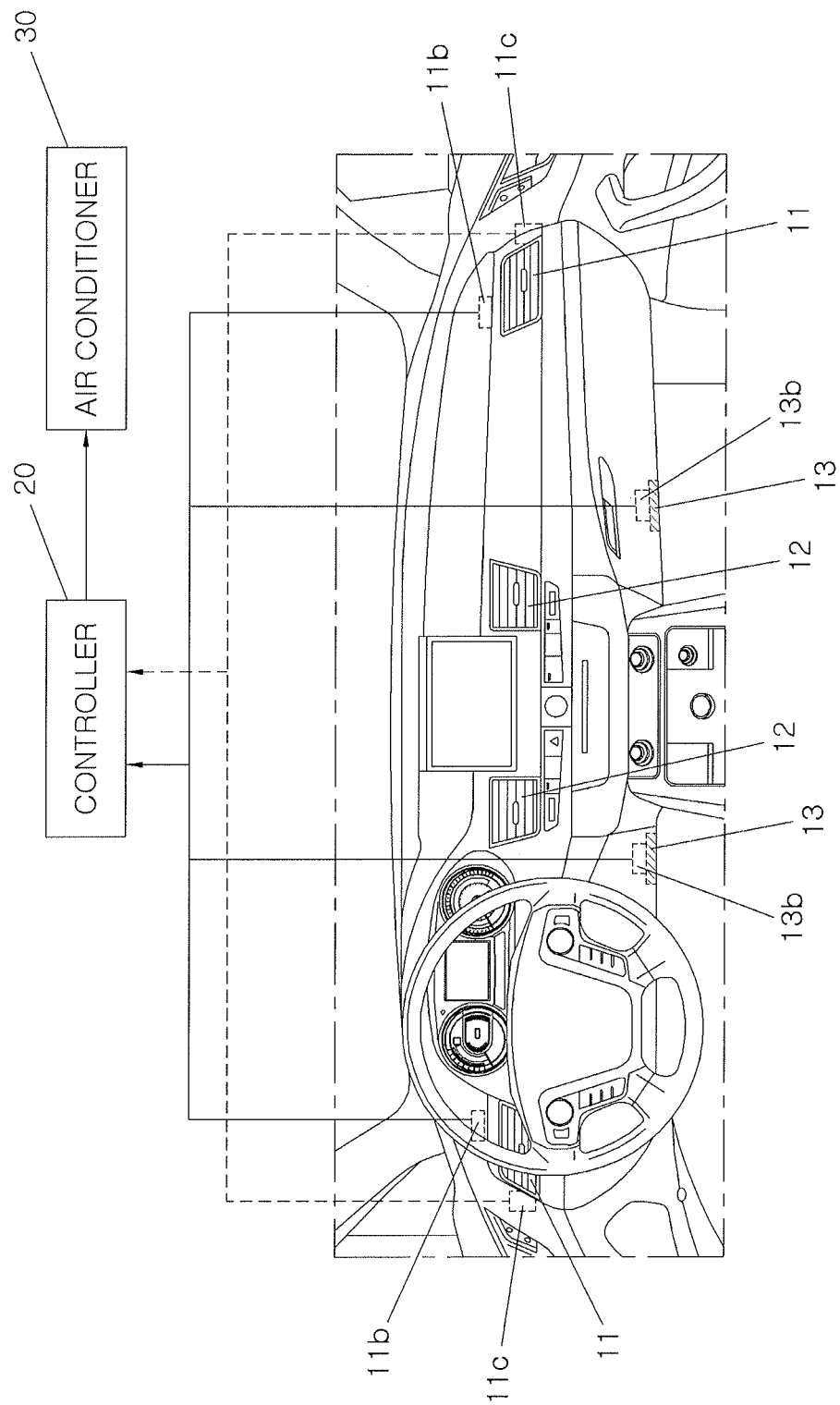
FIG. 1 is a schematic view illustrating an air conditioning control system for a vehicle according to a conventional art.
Figure 2:
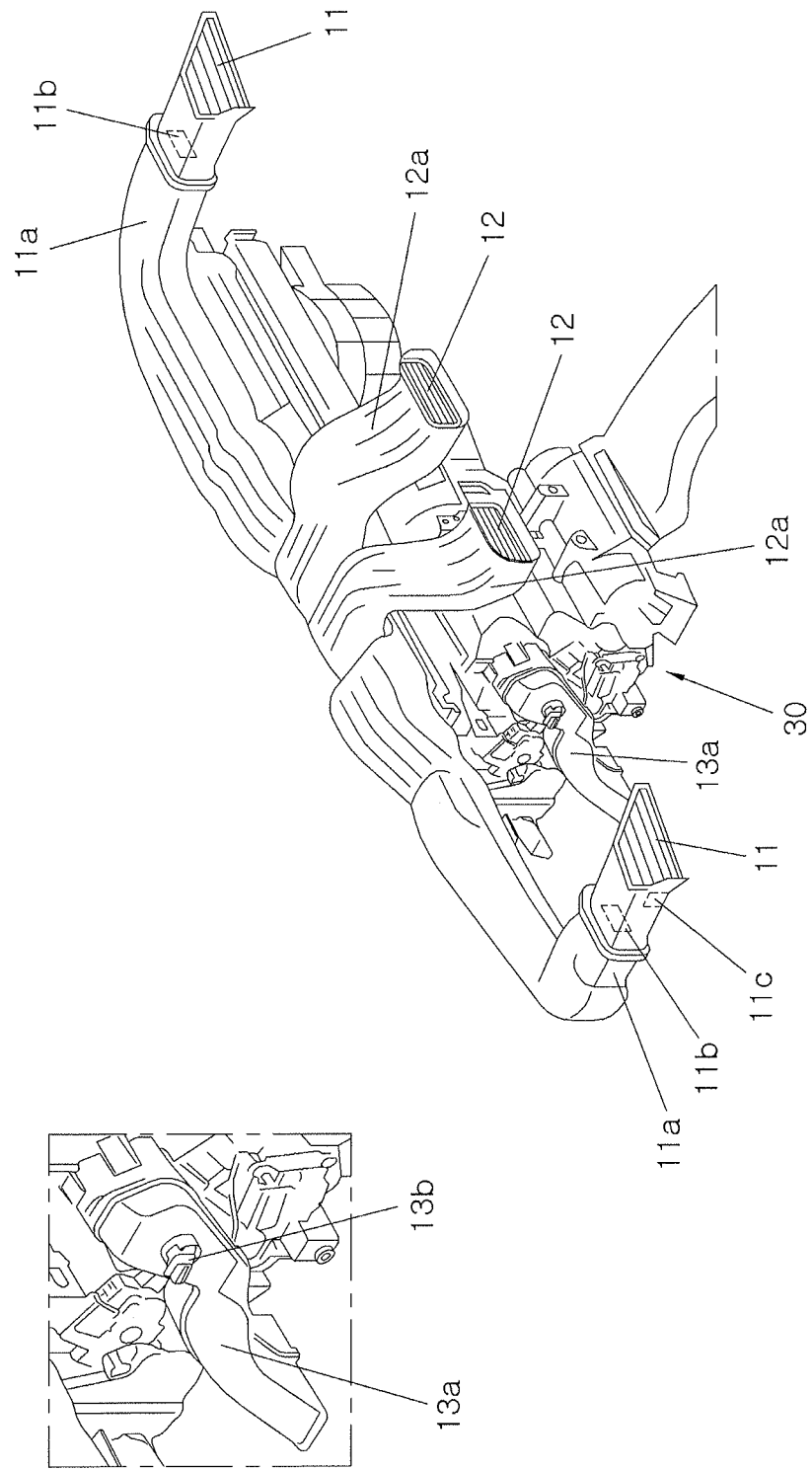
FIG. 2 is a perspective view illustrating the arrangement of ducts in the air conditioning control system according to the conventional art.
Figure 3:
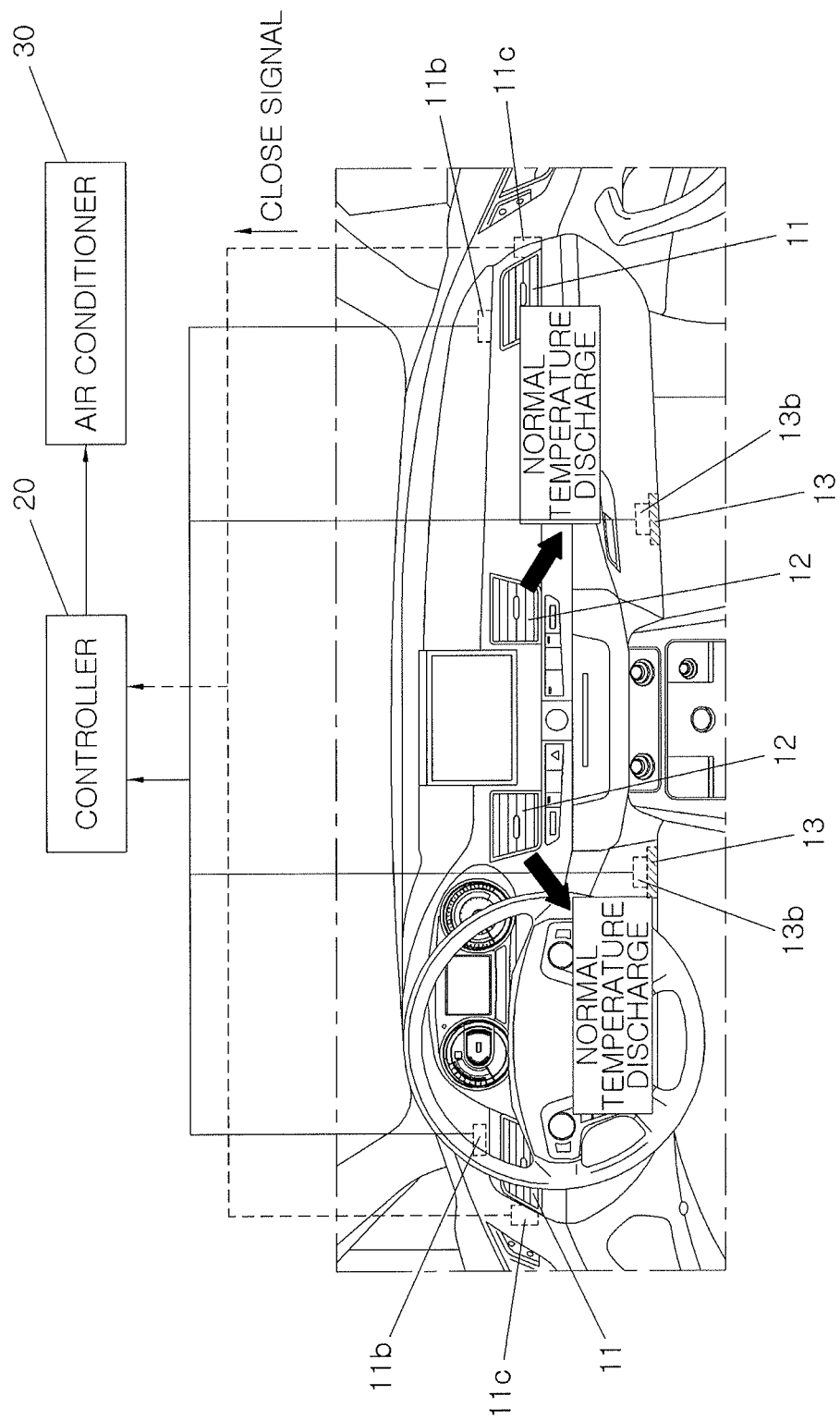
FIG. 3 is a schematic view illustrating a control operation when a side-vent-grill close signal is inputted from a grill open/close detecting device in the air conditioning control system according to the conventional art.
Figure 4:
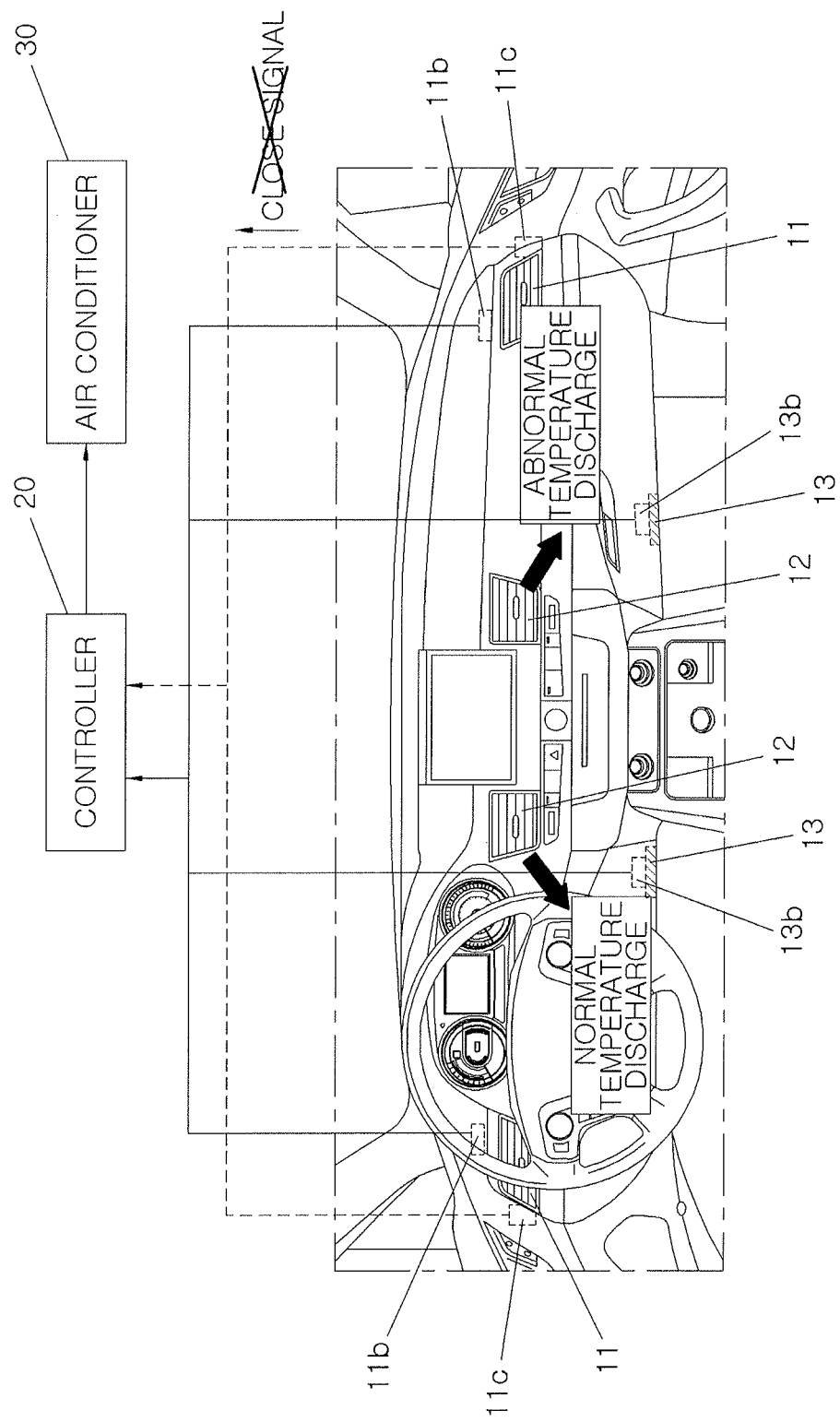
FIG. 4 is a schematic view illustrating a control operation when no side-vent-grill close signal is inputted from the grill open/close detecting device in the air conditioning control system according to the conventional art.
Figure 5:
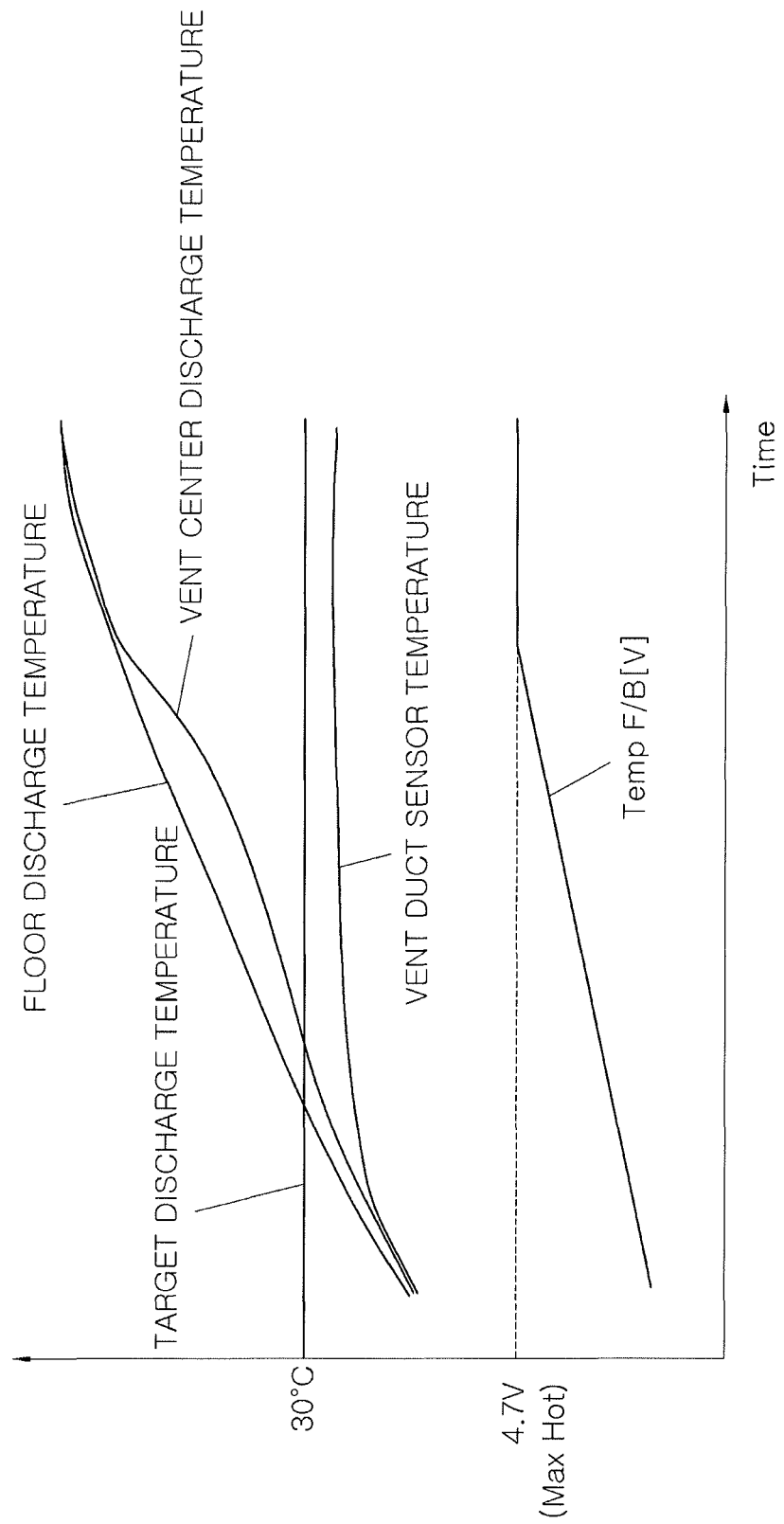
FIG. 5 is a graph showing discharge air temperatures of a side vent grill and a center vent grill when the air conditioning control system according to the conventional art is used.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, air conditioning control system and method for a vehicle according to an exemplary embodiment of the present invention will be described in detail with reference to the attached drawings.

Figure 6:
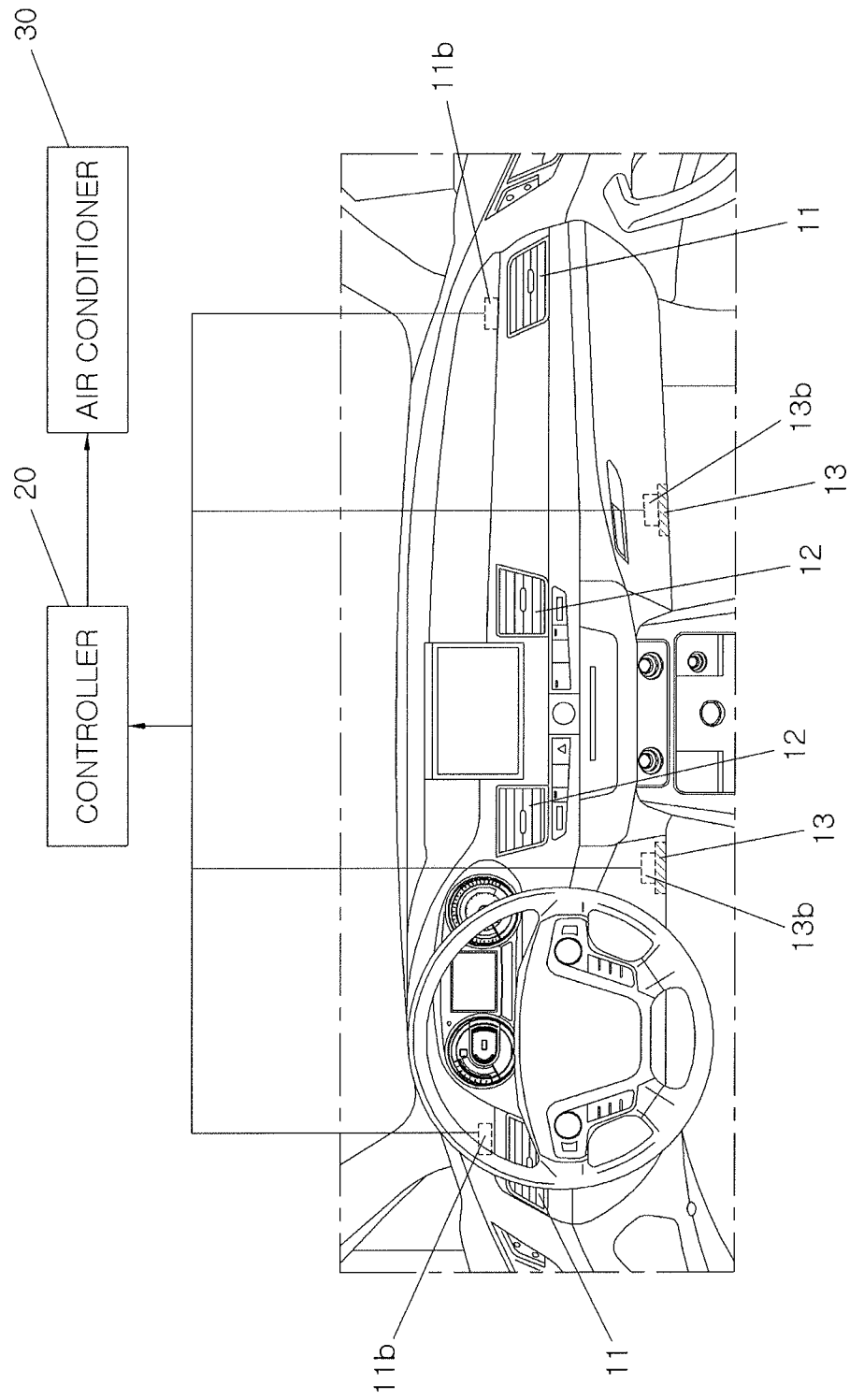
FIG. 6 is a schematic view illustrating an air conditioning control system for the vehicle according to an exemplary embodiment of the present invention.

First, the air conditioning control system according to an exemplary embodiment of the present invention will be described with reference to FIG. 6.

Side vent grills 11 are positioned in opposite ends of an upper portion of a dashboard of the vehicle. Each side vent grill 11 is mounted on an end of a corresponding side duct 11a. Air discharged through the side vent grills 11 is sent from opposite sides of the passenger compartment of the vehicle toward the faces or upper bodies of occupants, that is, a driver and a passenger.

Each side vent grill 11 is provided with a control knob facilitating an occupant to control the flow rate of air to be discharged through the side vent grill 11.

A side vent temperature sensor 11b is mounted in the side duct 11a to measure the temperature of air to be discharged through the side vent grill 11.

With regard to each side vent grill 11, a separate configuration, e.g., a grill open/close detecting device 11c, for detecting whether the side vent grill 11 is in an open or close state depending on the operation of the control knob is not mounted.

Center vent grills 12 are positioned in a central portion of the upper portion of the dashboard at positions spaced apart from each other, two center vent grills 12 are mounted so that air can be sent to the driver and the passenger. Each center vent grill 12 is positioned on an end of a corresponding center duct 12a. Air discharged through the center vent grills 12 is sent from a central portion of the passenger compartment of the vehicle toward the faces or upper bodies of the occupants, that is, the driver and the passenger. A control knob is also mounted in the center vent grill 12.

Shower duct discharge ports 13 are positioned in a lower portion of the dashboard at positions spaced apart from each other, two shower duct discharge ports 13 are also mounted so that air may be sent to both the driver and the passenger. Each shower duct discharge port 13 is mounted at such that it is formed by an end of a corresponding shower duct 13a or coupled to the end of the shower duct 13a.

The shower duct discharge port 13 is continuously in an open state.

A shower duct temperature sensor is mounted in the shower duct 13a to measure the temperature of air to be discharged through the shower duct 13a.

The air conditioner 30 is configured to supply air conditioned to a desired temperature into the passenger compartment of the vehicle. The air conditioner 30 performs a cooling or heating operation depending on the temperature in the passenger compartment and a temperature set by an occupant. The air conditioner 30 is configured to recirculate the air in the passenger compartment or introduce an outside air thereinto.

The occupant can use a control knob or control switch mounted on the dashboard to set a desired temperature and a desired air blowing mode.

The air blowing mode includes a vent mode, a bi-level mode, a floor mode, a mix mode and a DEF (defrost) mode. The vent mode refers to a mode in which cold/hot air is discharged toward the face or upper body of the occupant. The bi-level mode refers to a mode in which cool/hot air is discharged toward the floor of the passenger compartment and the face or upper body of the occupant. The floor mode refers to a mode in which cool/hot air is discharged toward the floor. The mix mode refers to a mode in which cool/hot air is discharged toward the windows of the vehicle and the floor. The DEF mode refers to a mode in which cool/hot air is discharged toward the windows.

A controller 20 controls the air conditioner 30 such that it is operated in accordance with the air temperature and air blowing mode set by the occupant, in an exemplary embodiment of the present invention, the controller 20 performs, using values outputted from the side vent temperature sensor 11b and the shower duct temperature sensor 13b, an air conditioning control method which will be described later herein, when the air conditioner 30 is operated in the vent mode or bi-level mode.

That is, in the vent mode or bi-level mode, when a difference between the temperature measured by the side vent temperature sensor 11b and the temperature measured by the shower duct temperature sensor 13b exceeds a preset alternate control entering temperature difference $\Delta T_a$, the controller 20 determines that the side vent grill 11 has been closed, and performs an alternate control operation of regarding the temperature measured by the shower duct temperature sensor 13b as the temperature outputted from the side vent temperature sensor 11b and controlling the temperature of air to be discharged from the center vent grills 12.

Furthermore, the controller 20 is configured such that when a time for which the air conditioner 30 is in the vent mode or the bi-level mode exceeds a preset alternate control entering time $t_a$ is the alternate control operation performed.

In addition, when the alternate control operation is performed, the controller 20 controls the flow rate of air discharged from the shower duct discharge port 13 such that the flow rate is continuously a predetermined value or more.

Partitioning the passenger compartment of the vehicle into a left region and a right region, the controller 20 separately controls air conditioning for a driver's seat and a passenger seat. This can be applied regardless of whether a function of independently controlling each of the driver's seat and the passenger seat is present.

When the alternate control operation is performed, the controller 20 individually controls the air conditioning for the driver's seat and the passenger seat. For example, when the side vent grill 11 of the driver's seat is closed and the side vent grill 11 of the passenger seat is in an open state, the alternate control operation is performed only for the driver's seat, and the normal control operation is performed for the passenger seat.

Figure 7A:
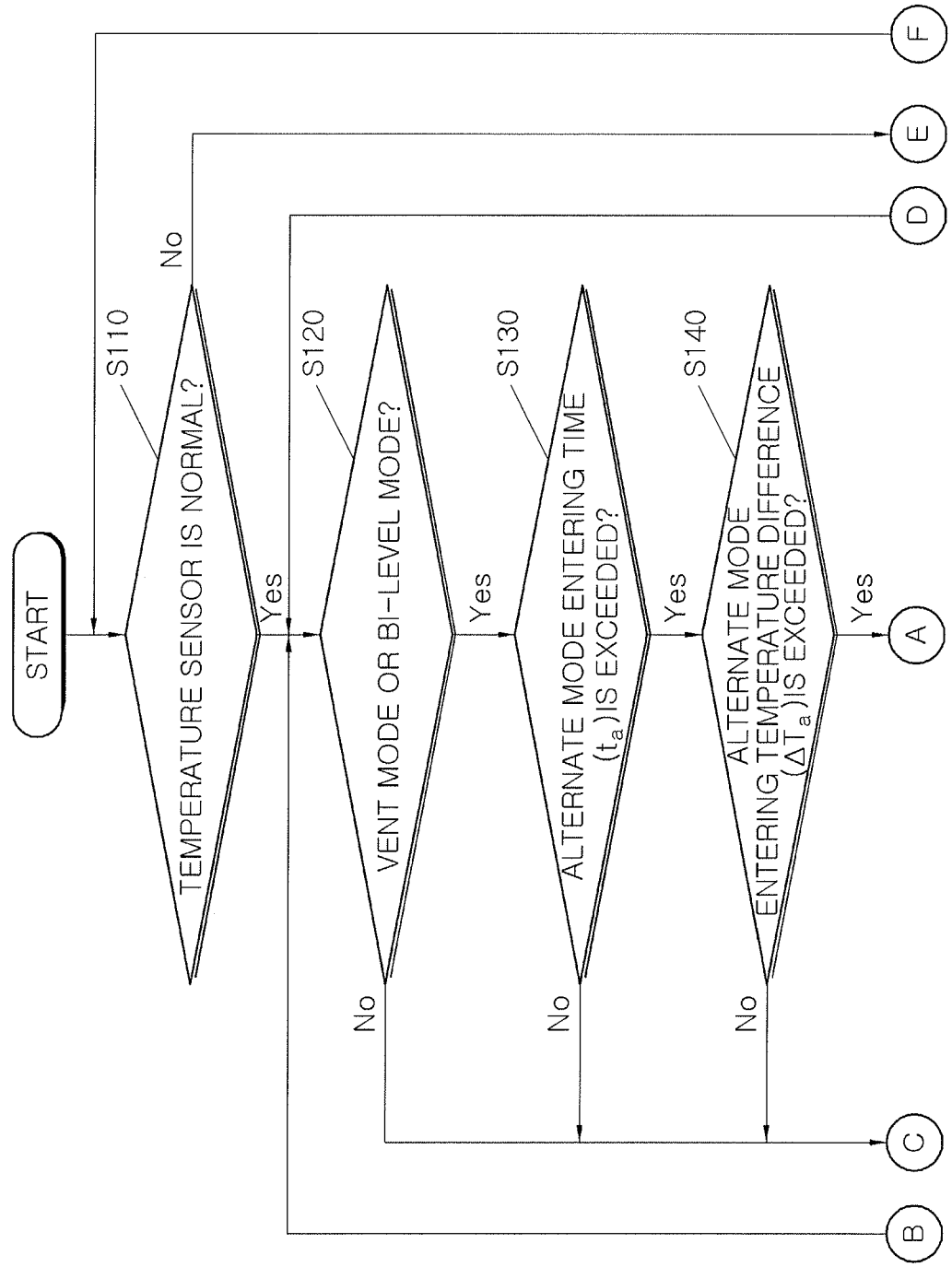
FIG. 7A and FIG. 7B are a flowchart illustrating an air conditioning control method for a vehicle according to an exemplary embodiment of the present invention.
Figure 7B:
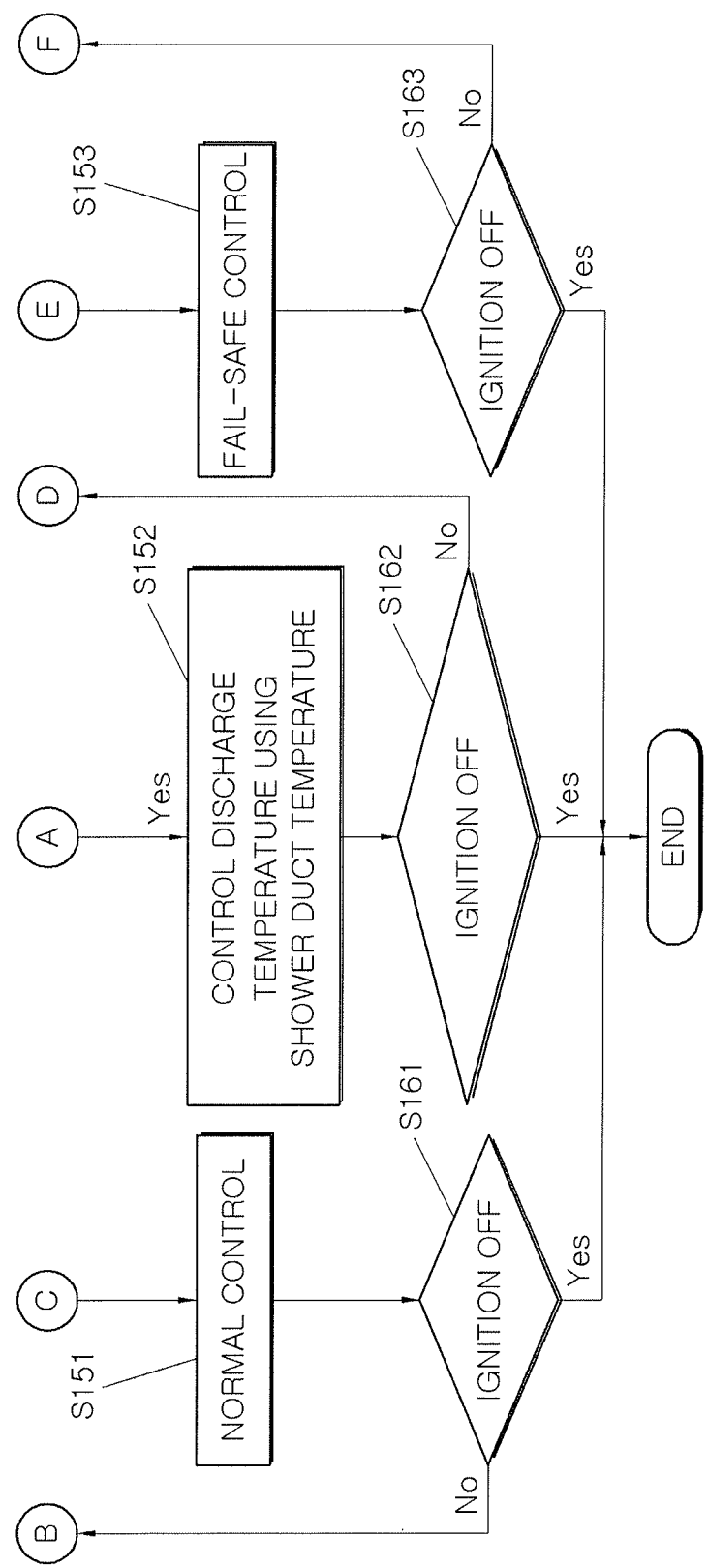

Hereinafter, the air conditioning control method for the vehicle according to an exemplary embodiment of the present invention will be described with reference to FIG. 7A and FIG. 7B.

At a temperature sensor condition determination step S110, whether the side vent temperature sensor 11b and the shower duct temperature sensor 13b are normal is determined. In an exemplary embodiment of the present invention, during the alternate control operation, the temperature measured by the shower duct temperature sensor 13b is used in place of the temperature measured by the side vent temperature sensor 11b. However, because the difference in temperature between the side vent temperature sensor 11b and the shower duct temperature sensor 13b is used to determine whether conditions for entering the alternate control state are satisfied, both the side vent temperature sensor 11b and the shower duct temperature sensor 13b must be normal.

Wen one of the side vent temperature sensor 11b and the shower duct temperature sensor 13b is not normal, a fail-safe control step S153 which is preset to be performed when a sensor is in an abnormal state is conducted.

At an air blowing mode determination step S120, whether the air conditioning mode of the vehicle is the vent mode or bi-level mode is determined.

In an exemplary embodiment of the present invention, when it is impossible to measure the temperature of air to be discharged from the side duct 11a because the side vent grill 11 has been closed, the alternate control operation is performed using the temperature of air to be discharged from the shower duct 13a. Therefore, only when, at the air blowing mode determination step S120, the air blowing mode is the vent mode or bi-level mode in which air can be discharged through the side vent grill 11 can the following steps be performed.

If, at the air blowing mode determination step S120, the air blowing mode is neither the vent mode nor bi-level mode, a normal control step S151 is performed. Since the floor mode or mix mode is not related to the side vent grill 11, the normal control step S151 of controlling the air conditioning of the vehicle in the typical manner is performed.

In the DEF mode, because air is sent only to the windows of the vehicle regardless of the side vent grill 11, the normal control step S151 is also performed such that air having a target discharge temperature is discharged.

At an alternate control entering time excess determination step S130, whether a time for which the air conditioning system is in the vent mode or the bi-level mode exceeds the alternate control entering time $t_a$ preset to enter the alternate control operation.

The reason why whether a time for which the air conditioning system is in the vent mode or the bi-level mode exceeds the alternate control entering time $t_a$ is because a temperature difference which will be described later herein is caused depending on the positions at which the side vent temperature sensor 11b and the shower duct temperature sensor 13b are mounted. In detail, the side vent temperature sensor 11b is mounted in the side duct 11a, and the shower duct temperature sensor 13b is mounted in the shower duct 13a. Therefore, because a temperature difference is caused after a predetermined time has passed, the controller 20 is operated such that a subsequent step is performed after the alternate control entering time $t_a$ has passed.

The alternate control entering time $t_a$ may be set to thirty seconds to two minutes.

At the alternate control entering time excess determination step S130, a time for which the air conditioning system is in the vent mode or the bi-level mode does not exceed the alternate control entering time $t_a$, the normal control step S151 of controlling the air conditioning system in the typical manner is performed.

At an alternate control entering temperature difference excess determination step S140, when a time for which the air conditioning system is in the vent mode or the bi-level mode exceeds the alternate control entering time, whether the difference in temperature between the side vent temperature sensor 11b and the shower duct temperature sensor 13b exceeds the alternate control entering temperature difference $\Delta T_a$ preset to enter the alternate control operation is determined.

In this control operation, the temperature measured by the shower duct temperature sensor 13b substitutes for the temperature measured by the side vent temperature sensor 11b. In this regard, an occupant may have an unpleasant feeling when the difference in temperature between his/her face or upper body and feet exceeds a predetermined level. To prevent this, whether the difference in temperature between the side vent temperature sensor 11b and the shower duct temperature sensor 13b exceeds the alternate control entering temperature difference $\Delta T_a$ is determined, whereby whether the air conditioning system enters the alternate control operation is determined.

The alternate control entering temperature difference $\Delta T_a$ is preferably set within a range from 15° C. to 20° C., when a difference between the temperatures of air discharged toward the upper and lower parts (face/feet) of the occupant is greater than approximately 15° C. to 20° C., the occupant may begin to have an unpleasant feeling. Therefore, the alternate control entering temperature difference $\Delta T_a$ may be set within a range from 15° C. to 20° C.

Meanwhile, at the alternate control entering temperature difference excess determination step S140, when the difference in temperature between the side vent temperature sensor 11b and the shower duct temperature sensor 13b does not exceed the alternate control entering temperature difference $\Delta T_a$, the normal control step S151 of controlling the air conditioning of the vehicle in the typical manner is performed.

At an alternate control step S152, when the difference in temperature between the side vent temperature sensor 11b and the shower duct temperature sensor 13b exceeds the alternate control entering temperature difference $\Delta T_a$, the controller 20 determines that the side vent grill 11 has been closed, regards the temperature measured by the shower duct temperature sensor 13b as the temperature of air discharged from the side vent grill 11, and controls the temperature of air to be discharged from the center vent grill 12.

When the side vent grill 11 is closed, there is no flow of air through the side duct 11a. Because the shower duct discharge port 13 is continuously in the open state, the temperature of air to be discharged from the shower duct discharge port 13 is measured, and this is used to control the temperature of air to be discharged from the center vent grill 12.

At the alternate control step S152, the air conditioning system is controlled such that air is supplied to the shower duct 13a continuously at a predetermined flow rate. At the alternate control step S152, because the output value of the shower duct temperature sensor 13b is used in place of the output value of the side vent temperature sensor 11b, air must be discharged from the shower duct 13a at the minimum flow rate such that the shower duct temperature sensor 13b can be operated.

In this regard, although in the bi-level mode air is discharged from the side vent grill 11, the center vent grill 12 and the shower duct discharge port 13, air is discharged in the vent mode only from the side vent grill 11 and the center vent grill 12. Given this, the air condition system is controlled such that in the vent mode air is also discharged from the shower duct discharge port 13 at the minimum flow rate. In this regard, the minimum flow rate of air discharged from the shower duct discharge port 13 is set to approximately 7% to 9%, and preferably, to approximately 8% of the entire flow rate.

Therefore, at the alternate control step S152, because at least 8% of the entire discharge air is discharged through the shower duct discharge port 13, the temperature of air to be discharged from the shower duct discharge port 13 can be measured by the shower duct temperature sensor 13b and used to control the air conditioning system.

At the alternate control step S152, the controller 20 partitions the passenger compartment of the vehicle into the left region and the right region and separately controls air conditioning for the driver's seat and the passenger seat. This can be applied regardless of whether the function of independently controlling each of the driver's seat and the passenger seat is present.

When the alternate control step S152 is performed, the controller 20 individually controls the air conditioning for the driver's seat and the passenger seat. For example, when the side vent grill 11 of the driver's seat is closed and the side vent grill 11 of the passenger seat is in the open state, the alternate control step S152 is performed only for the driver's seat, and the normal control step S151 is performed for the passenger seat.

After the normal control step S151 and the alternate control step S152 or the fail-safe control step S153 have been performed, ignition off determination steps S161, S162 and S163 are respectively performed. When it is determined that the vehicle is in an ignition off state, the process is finished.

Otherwise, that is, when the vehicle is continuously in the ignition on state after the normal control step S151 and the alternate control step S152 have been performed, the process returns to the first step, and the above-mentioned steps are repeatedly performed. When the vehicle is continuously in the ignition on state after the fail-safe control step S153 has been performed, the process returns to the temperature sensor condition determination step S110, and the corresponding following steps are performed again.

According to an exemplary embodiment of the present invention, as shown in FIG. 8, in the case where in the vent mode or the bi-level mode the side vent grill 11 is closed, as a command voltage value of an actuator for operating a temp door is controlled through the alternate control operation, the temperature of air to be discharged through the center vent grill 12 and the temperature of air to be discharged through the shower duct discharge port 13 can be controlled to be close to the target discharge temperature. Although the case of a heating process has been illustrated in FIG. 8, even during a cooling process, the temperature of air to be discharged through the center vent grill 12 and the temperature of air to be discharged through the shower duct discharge port 13 can also be controlled to be close to the target discharge temperature.

Therefore, even when there is no flow of air through the side vent grill 11 and the temperature of air measured by the side vent temperature sensor 11b is far different from the target discharge temperature, the passenger compartment can be prevented from being excessively cooled or heated, whereby pleasant air can be provided to the occupant.

As described above, in air conditioning control system and method according to an exemplary embodiment of the present invention, whether the side vent grill is in an open state or in a closed state can be determined using a difference between temperatures measured by a side vent temperature sensor and a shower duct temperature sensor without using a separate grill open/close detecting device for detecting whether the side vent grill is in the open state or in the closed state.

Furthermore, because whether the side vent grill is in the open state or in the closed state is determined using a difference between temperatures measured by the side vent temperature sensor and the shower duct temperature sensor, the air conditioning system can supply, through the center vent grill, air conditioned such that the temperature of air in a passenger compartment becomes a temperature set by an occupant, whereby pleasant air can be supplied to the occupant.

In addition, since a separate grill open/close detecting device for detecting whether the side vent grill is in the open state or in the closed state is not required, a weight of the vehicle and the production cost can be reduced. Because there is no need to install the grill open/close sensing unit, the manufacturing process can be simplified.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an air conditioning control system for a vehicle, the air conditioning control system comprising: side vent grills mounted in respective opposite ends of an upper portion of a dashboard; center vent grills mounted in a central portion of the upper portion of the dashboard at positions spaced apart from each other; shower duct discharge ports mounted in a lower portion of the dashboard at positions spaced apart from each other; a side vent temperature sensor configured to measure a first temperature of air to be discharged from each of the side vent grills; and a shower duct temperature sensor configured to measure a second temperature of air to be discharged from each of the shower duct discharge ports, the method comprising:

determining, by a controller, a temperature control operation of whether at least one of the side vent temperature sensor and the shower duct temperature sensor is operated in normal;

determining, by the controller, whether an air blowing mode is a vent mode in which air is discharged toward a face or an upper body of an occupant or a bi-level mode in which air is discharged toward a floor of the vehicle and the face or the upper body of the occupant;

determining, by the controller, whether a time lapsed after the air blowing mode entering the vent mode or the bi-level mode exceeds a preset alternate control entering time $t_a$; and determining, by the controller, whether a difference in the first and second temperatures exceeds a preset temperature difference $\Delta T_a$ to enter an alternate control operation, wherein the alternate control operation is defined to substitute the first temperature with the second temperature for controlling a temperature of air to be discharged from the center vent grills, wherein the controller is configured to perform the alternate control operation when both the side vent temperature sensor and the shower duct temperature sensor are operated in normal, when the side vent grills have been closed, when the preset alternate control entering time $t_a$ is lapsed, and when the preset temperature difference $\Delta T_a$ is obtained, to control a flow rate of air discharged from the shower duct discharge ports to be continuously equal to a predetermined value, wherein the controller is configured to perform a preset fail-safe control operation when one of the side vent temperature sensor and the shower duct temperature sensor is abnormal, wherein the controller is configured to perform a normal control operation when the air blowing mode is neither the vent mode nor the bi-level mode, when the time for which an air conditioner is in the vent mode or the bi-level mode does not exceed the alternate control entering time $t_a$, or when the difference in temperature between the side vent temperature sensor and the shower duct temperature sensor does not exceed the preset temperature difference $\Delta T_a$, wherein the alternate control operation is independently performed to each of a driver's seat and a passenger seat, and wherein when the alternate control operation is performed, the flow rate of the air to be discharged from the shower duct discharge ports is at a minimum flowrate.

2. The method of claim 1, wherein the alternate control entering time $t_a$ is set within a range from thirty seconds to two minutes.

3. The method of claim 1, wherein the preset temperature difference $\Delta T_a$ is set within a range from 15° C. to 20° C.

4. The method of claim 1, further comprising,
after the alternate control operation is performed, determining whether the vehicle is in an ignition on or off state is performed, and
wherein when the vehicle is in the ignition on state, a process returns to the determining whether the difference in the first and second temperatures exceeds the preset temperature difference $\Delta T_a$.

5. The method of claim 1, further comprising,
after the normal control operation is performed, determining whether the vehicle is in an ignition on or off state is performed, and
wherein when the vehicle is in the ignition on state, a process returns to a first step determining the temperature sensor condition.

6. The method of claim 1, further comprising,
after the normal control operation is performed, determining whether the vehicle is in an ignition on or off state is performed,
wherein when the vehicle is in the ignition on state, a process returns to a first step determining the temperature sensor condition.

7. The method of claim 1, further comprising,
after the fail-safe control operation is performed, determining whether the vehicle is in an ignition on or off state is performed, and
wherein when the vehicle is in the ignition on state, a process returns to a first step of determining the temperature sensor condition.

8. The method of claim 1, wherein the minimum flow rate of air discharged from the shower duct discharge ports is set to approximately 7% to 9% of an entire flow rate.

9. The method of claim 8, wherein the minimum flow rate of air discharged from the shower duct discharge ports is set to approximately 8% of the entire flow rate.

10. A method of controlling an air conditioning control system for a vehicle, the air conditioning control system comprising: side vent grills mounted in respective opposite ends of an upper portion of a dashboard; center vent grills mounted in a central portion of the upper portion of the dashboard at positions spaced apart from each other; shower duct discharge ports mounted in a lower portion of the dashboard at positions spaced apart from each other; a side vent temperature sensor configured to measure a first temperature of air to be discharged from each of the side vent grills; and a shower duct temperature sensor configured to measure a second temperature of air to be discharged from each of the shower duct discharge ports, the method comprising:

determining, by a controller, a temperature sensor condition of whether at least one of the side vent temperature sensor and the shower duct temperature sensor is operated in normal;

determining, by the controller, whether an air blowing mode is a vent mode in which air is discharged toward a face or an upper body of an occupant or a bi-level mode in which air is discharged toward a floor of the vehicle and the face or the upper body of the occupant;

determining, by the controller, whether a time lapsed after the air blowing mode entering the vent mode or the bi-level mode exceeds a preset alternate control entering time $t_a$; and determining, by the controller, whether a difference in the first and second temperatures exceeds a preset temperature difference $\Delta T_a$ to enter an alternate control operation, wherein the alternate control operation is defined to substitute the first temperature with the second temperature for controlling a temperature of air to be discharged from the center vent grills;

wherein the alternate control entering time $t_a$ is set within a range of thirty seconds to two minutes, wherein the preset temperature difference $\Delta T_a$ is set within a range from 15° C. to 20° C., wherein the controller is configured to perform the alternate control operation when both the side vent temperature sensor and the shower duct temperature sensor are operated in normal, when the side vent grills have been closed, when the preset alternate control entering time $t_a$ is lapsed in the range of thirty seconds to two minutes and the preset temperature difference $\Delta T_a$ is obtained in the range of 15° C. to 20° C., to control a flow rate of air discharged from the shower duct discharge ports to be continuously equal to a predetermined value, wherein the controller is configured to perform a preset fail-safe control operation when one of the side vent temperature sensor and the shower duct temperature sensor is abnormal, wherein the alternate control operation is independently performed to each of a driver's seat and a passenger seat, and wherein when the alternate control operation is performed, the flow rate of the air to be discharged from the shower duct discharge ports is at a minimum flowrate.

11. The method of claim 10, wherein the minimum flow rate of air discharged from the shower duct discharge ports is set to approximately 7% to 9% of an entire flow rate.

12. The method of claim 10, wherein the minimum flow rate of air discharged from the shower duct discharge ports is set to approximately 8% of the entire flow rate.

* * * * *